(12) United States Patent
Jarosz et al.

(10) Patent No.: US 12,560,922 B2
(45) Date of Patent: Feb. 24, 2026

(54) INDUSTRIAL PLANT AND METHOD FOR GRAPHICALLY REPRESENTING SYNCHRONOUS RELATIONSHIPS

(71) Applicant: Siemens Aktiengesellschaft, Munich (DE)

(72) Inventors: Piotr Jarosz, Chemnitz (DE); Ronny Klier, Chemnitz (DE); Thomas Scherf, Lichtenau (DE); Sven Schneider, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 384 days.

(21) Appl. No.: 18/127,087

(22) Filed: Mar. 28, 2023

(65) Prior Publication Data

US 2023/0315074 A1 Oct. 5, 2023

(30) Foreign Application Priority Data

Mar. 29, 2022 (EP) .................................... 22165098

(51) Int. Cl.
G05B 19/418 (2006.01)
G06F 3/04847 (2022.01)

(52) U.S. Cl.
CPC ... G05B 19/41885 (2013.01); G06F 3/04847 (2013.01); *G05B 2219/32128* (2013.01)

(58) Field of Classification Search
None
See application file for complete search history.

(56) References Cited

U.S. PATENT DOCUMENTS

| | | | |
|---|---|---|---|
| 2002/0082483 A1* | 6/2002 | Bungert | G05B 19/0426 600/300 |
| 2002/0131536 A1* | 9/2002 | Veillette | H04L 7/0083 375/347 |
| 2007/0005266 A1* | 1/2007 | Blevins | G05B 19/0426 702/22 |
| 2010/0031199 A1* | 2/2010 | Birzer | G05B 19/042 715/854 |
| 2020/0320105 A1* | 10/2020 | Korpman | G06F 16/9024 |
| 2024/0072842 A1* | 2/2024 | Aki | H04W 56/0035 |

FOREIGN PATENT DOCUMENTS

| | | |
|---|---|---|
| DE | 10125384 | 7/2002 |
| EP | 1217476 | 6/2002 |
| EP | 2149825 | 2/2010 |

* cited by examiner

*Primary Examiner* — Hua Lu
(74) *Attorney, Agent, or Firm* — Cozen O''Connor

(57) ABSTRACT

An industrial plant and method for graphically representing synchronous relationships, wherein the industrial plant includes a first control device in which a first user program executes, a second control device in which a second user program executes, and a plurality of drives which are controlled and/or regulated by the user programs, where objects are assigned to the drives in the user programs, synchronous relationships exist between the objects, the user programs have a plurality of different flow structures which have an influence on the synchronous relationships between the objects such that a synchronous relationship is either an active synchronous relationship or an inactive synchronous relationships, and where an apparatus for graphical representation of synchronous relationships is provided between the objects to simplify diagnosis of synchronous operations.

12 Claims, 4 Drawing Sheets

FIG 1

INDUSTRIAL PLANT AND METHOD FOR GRAPHICALLY REPRESENTING SYNCHRONOUS RELATIONSHIPS

BACKGROUND OF THE INVENTION

1. Field of the Invention

The invention relates to an industrial plant comprising a first control device in which a first user program executes, a second control device in which a second user program executes, a plurality of drives that are controlled or regulated by the user programs, to which drives objects are assigned in the user programs, where synchronous relationships exist between the objects, where the user programs have a plurality of different process structures that have an influence on the synchronous relationships between the objects so that a synchronous relationship is either an active synchronous relationship or an inactive synchronous relationship.

The invention also relates to a method for graphically representing synchronous relationships between a plurality of drives in an industrial plant, where objects are assigned to the drives in a first user program for a first control device and in a second user program for a second control device and the objects are configured, the plurality of drives are controlled and/or regulated by the user program, the user programs are configured such that a plurality of different process structures occurs, which have an influence on the synchronous relationships between the objects such that a synchronous relationship is either an active synchronous relationship or an inactive synchronous relationship.

2. Description of the Related Art

EP 2 149 825 B1 discloses a project navigator for hierarchical representation of technology objects on a display apparatus, where the technology objects are interconnected among each other and modulate a machine with a cascaded synchronous control.

EP 1 217 476 A2 discloses an apparatus and a method for commissioning and diagnosing control systems, where a control program for the control system is based on an object model and has technology objects for synchronous axles.

SUMMARY OF THE INVENTION

It is an object of the present invention to provide realize improved diagnostics options of distributed synchronizations in comparison to conventional systems and methods.

This and other objects and advantages are achieved in accordance with the invention by an industrial plant in which an apparatus for graphical representation of synchronous relationships exists between the objects, where the apparatus has an analysis tool that is configured to analyze the user programs with respect to the objects and the synchronous relationships between the objects via a data link and is further configured to obtain a first data record relating to the used objects, on the one hand, and a second data record relating to a temporal relation relating to active and inactive synchronous relationships between the objects, on the other hand, from the analytically determined data and a preparation center is present for graphical representation on a display, where the preparation center is configured to graphically represent the objects with their active or inactive synchronous relationships based on the determined first data record and the determined second data record.

The active synchronizations are selected during a machine runtime in a situational manner by the control programs. As a result, it is advantageous that the representation of active synchronizations occurs here as a diagram over time. For machine commissioning, a user requires information relating to each of the active synchronizations. It should be noted here that the high processing speeds of the control programs may result in frequent changes to the active synchronizations, which must subsequently also be made clear and transparent based on recordings.

In a further embodiment, the apparatus includes a recorder, which is configured to install a first read service on the first control device and a second read service on the second control device, where the read services are established to perform a tracing of the objects in the first user program or in the second user program and in the process to record a temporal assignment to status data, synchronization data and operating mode data of the objects in a first trace file or a second trace file. Furthermore, the preparation center is configured to display a course of the active synchronous relationship between two objects, which are located on different control devices, on the display with the aid of the recorded trace files of the control devices.

The course of the active synchronous relationship can now advantageously also be made clear and transparent on different control devices. With synchronous relationships beyond the limits of a control device, reference is made to distributed synchronizations. The configuration data of the projected interconnections and the communication between the control devices, the current interconnection states (e.g., inactive, active, synchronization of selected interconnection partners) as well as current object states (e.g., in processing, in an error state) belong to the requisite data required for detecting the distributed synchronizations. The individual technological objects can be calculated on different control devices, reference is then made to distributed synchronization.

In accordance with the disclosed embodiments of the invention, the interaction of all technology objects is shown at a specific time instant in a graphical representation. This makes an overall view of the synchronizations between the technology objects on the industrial plant possible beyond control limits also, i.e., distributed synchronizations. A user of the industrial plant is now in a position to visually detect the synchronizations prevailing at this time instant in each commissioning step.

The diagnostic option already shown is further improved because the preparation center is further configured to prepare a time slider for representation in the display and because the time slider is configured to display the course of the active synchronous relationship on the display for a respectively selected time instant and thus to render clearly and transparently the course of the active synchronous relationships. It is now possible to work interactively with the time slider, e.g., it is gripped via a mouse, for instance, and is shifted in time to the right or back in time to the left and the synchronous relationships given in the process flow structure at the selected time instant change between the technology objects or between the objects as a function of the position of the time slider.

The diagnostic option is further refined if the analyzing tool is configured to examine the data of the objects and the data of the synchronous relationships between the objects for specific variables which have the following subdata: an identification number of an object, a type that can assume the values comprising master object or slave object, a state that specifies active or inactive, an operating mode that specifies the values comprising speed or position synchronization, and/or a list that specifies the identification numbers of the potential master objects to a slave.

An algorithm for representing the active synchronizations can be further simplified if the analyzing tool is configured to browse through the user programs for project files, in which synchronous relationships have been configured between the objects to determine a quantity of potential couplings between the objects from the project files.

It is also an object of the invention to provide a method in which, via an apparatus for graphically representing the synchronous relationships between the objects, an analyzing tool is operated so that the user programs are analyzed with respect to the objects and the synchronous relationships between the objects via a data link and a first data record relating to the used objects, on the one hand, and a second data record relating to a temporal relation of active and inactive synchronous relationships between the objects, on the other hand, is determined from the analytically determined data, a preparation center is operated that graphically represents the objects with its active and/or inactive synchronous relationships based the determined first data record and the determined second data record, for representation on a display.

For a further improved diagnostic capability, a first read service on the first control device and a second read service on the second control device is installed via a recorder, where the read services performs a tracing of the objects in the first user program or a tracing of the objects in the second user program and in the process record a temporal assignment to status data, synchronization data and operating mode data of the objects in a first trace file or in a second trace file. Furthermore, a course of the active synchronous relationships between two objects, which are located on different control devices, is further displayed on the display via the preparation center with the aid of the recorded trace files of the control devices.

The diagnostic capability is improved once again if a time slider is furthermore prepared for representation in the display using the preparation center and, via the time slider, maintenance personal can indicate the course of the active synchronous relationship on the display for a time instance selected in each case and thus comprehend the course of the active synchronous relationship, in particular the distributed synchronous relationships.

Furthermore, it is advantageous if the data of the objects and the data of the synchronous relationship between the objects is examined for specific variables using the analyzing tool, here the following subdata is examined: an identification number of an object, a type that can assume the values comprising master object or slave object, a state that specifies active or inactive, an operating mode that specifies the values comprising speed or position synchronization, and a list that specifies the identification number of the potential master objects to a slave.

It is also advantageous if the user programs are browsed for project files using the analyzing tool, in which project files synchronous relationships have been configured and defined between the objects and a quantity of potential couplings between the objects can be determined from the project files.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the inventive method and the inventive apparatus is explained in more detail below based on the drawings, in which:

FIG. 1 shows an industrial plant with drives and an apparatus for graphical representation of synchronous relationships in accordance with the invention;

DETAILED DESCRIPTION OF THE EXEMPLARY EMBODIMENTS

Figure 1:
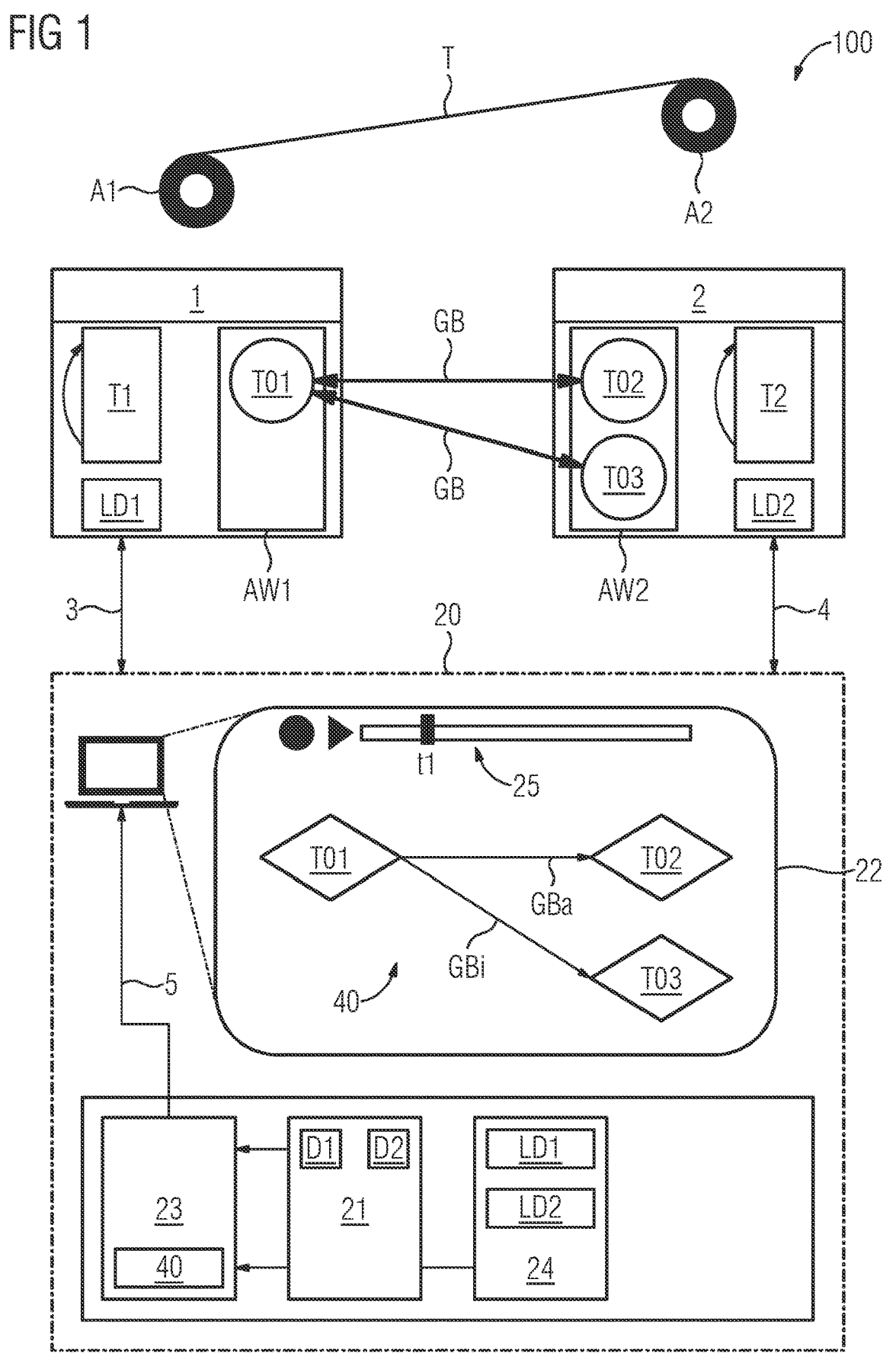
Figure 2:
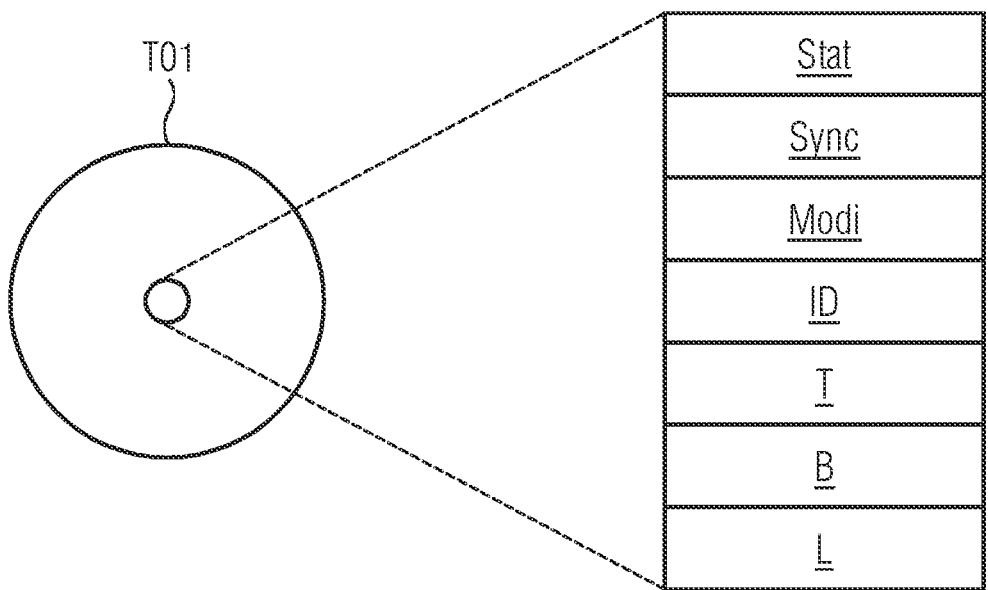
FIG. 2 shows an object, i.e., a technology object, which is assigned to drives in accordance with the invention.

With reference to FIG. 1, shown there is an industrial plant 100 with a first control device 1 and a second control device 2. The first control device 1 has a first user program AW1 and the second control device 2 has a second user program AW2. A first object T01 is embedded in the first user program AW1. The first object T01 is responsible for controlling and regulating the first drive A1. A second object T02 and a third object T03 is embedded in the second user program AW2, where the second object T02 is responsible for controlling the second drive A2.

The first drive A1 is connected to the second drive A2 via a conveyor belt T. In order to ensure the conveyor belt T does not tear, both drives A1, A2 must be in synchronism, and there is therefore a synchronous relationship between the first drive A1 and the second drive A2. The drives A1 and A2 are controlled by different control devices 1, 2. As a result, reference is made to a distributed synchronous operation.

The distributed synchronous operation can also be understood to mean an electrical shaft. An electrical shaft is understood to mean the simulation of the function of a mechanical shaft with the aid of electrical machines. Here, the mechanical connection is replaced by a suitable wiring of the machines or also by a regulator. The aim is an isogonic transmission of rotational movements and torques without a mechanical coupling.

Accordingly, the objects T01, T02 are assigned to the drives A1, A2 in the user programs AW1, AW2 and, in order to simulate this mechanical coupling of the shaft, there is a synchronous relationship GB between the first object T01 and the second object T02. A plurality of different process structures, which have an influence on the synchronous relationships GB between the objects T01, T02, T03, such that a synchronous relationship GB is either an active synchronous relationship GBa or an inactive synchronous relationship GBi, execute in the user programs AW1, AW2. Consequently, a status of the synchronous relationship changes as a function of the program sequence.

In order, in particular, to facilitate a commissioning and/or a diagnostic option for commissioning engineers of the industrial plant 100, in accordance with the invention an apparatus 20 is provided for graphical representation of synchronous relationships GBa, GBi between the objects T01, T02, T03. The apparatus 20 has an analyzing tool 21, which is configured to analyze the user programs AW1, AW2 with respect to the objects T01, T02, T03 and the parameterized synchronous relationships between the objects T01, T02, T03 via data link. The analyzing tool 21 is configured here to browse the user programs AW1, AW2 for the presence of project files, in which synchronous relationships have been configured between the objects T01, T02, T03 to obtain a quantity of potential couplings 60 between the objects T01, T02, T03 from the project data. In order to clarify the potential couplings 60, see also FIG. 3.

For graphical representation of the synchronous relationships between the objects T01, T02, T03, a preparation center 23 is available which is configured to graphically represent the objects T01, T02, T03 with their active or inactive synchronous relationships GBa, GBi using the determined first data record D1 and the determined second data record D2.

A selection of active synchronous operations is performed during the machine runtime depending on the situation by the control programs AW1 and AW2. The representation of the synchronous operations between the objects T01, T02, T03 is performed here as a diagram over time. For a machine commissioning, the user therefore requires information about the respectively active synchronous operations GBa. It should be noted here that a high processing speed of the control programs AW1, AW2 results in frequent changes to the active synchronous operations GBa, which must subsequently also be made clear and transparent.

To this end, it is advantageous that the apparatus 20 has a recorder 24, which is configured to install a first read service LD1 on the first control device 1 and a second read service LD2 on the second control device 2, where the first and second read services LD1, LD2 are configured to perform a tracing of the first object T01 in the first user program AW1 and a tracing of the second object T02 and the third object T03 in the second user program AW2. With the first and second read services LD1, LD2, a first trace file T1 or a second trace file T2 is recorded. In order to now render clear and transparent the course of the active distributed synchronous operations, the first and second read services LD1, LD2 are used to set up quasi recording functions on the control devices 1, 2 which correspond to a trace. Here, a permanent recording can also be realized, i.e., an endless trace.

The preparation center 23 is further configured here to indicate, with the recorded trace files T1, T2 of the control devices 1, 2, a course 40 of the active synchronous relationships GBa between two objects T01, T02, which are located on different control devices 1, 2, from the display 22.

Therefore, the course of the active synchronous relationships GBa has thus been made clear and transparent. A configuration of the projected interconnections and the communication between the control devices 1, 2, the current interconnection states (e.g., inactive, active, synchronization, selected interconnection partner) as well as current object states (e.g., processing or error state) form part of the requisite data. The analyzing tool 21 is established here to examine the data of the objects T01, T02, T03 and the data of the synchronous relationships GBi, GBa between the objects T01, T02, T03 for specific variables which have the following subdata: an identification number ID (see to this end the example in FIG. 2), a type T, which can assume values comprising master object or slave object, a state Z which specifies active or inactive, an operating mode B which specifies values comprising speed or position synchronization, and/or a list L which specifies the identification numbers ID of the potential master objects to a slave.

The preparation center 23 is further configured to prepare a time slider 25 for representation in the display 22, where the time slider 25 is configured to display the course 40 of the active synchronous relationship GBa on the display 22 for a respectively selected time instant t1 and thus to render clear and transparent the course of the active synchronous relationships GBa.

In the display 22, the time slider 25 is on the time instant t1 and at time instant t1 the first object T01 has an active synchronous relationship GBa with the second object T02 and the first object T01 has an inactive synchronous relationship GBi with the third object T03.

The graphical data 5 required for this is prepared for the display 22 via the preparation center 23. The first read service LD1 in the first user program AW1 or in the first control device 1 sends its data via a first data path 3 to the apparatus 20. The second read service LD2 in the second control device 2 sends its data via a second data path 4 to the apparatus 20.

With reference to FIG. 2, the first object T01 is shown with its variables or its subdata for determining a synchronous relationship. An identification number ID specifies which object is involved. A type T states whether it is a master or a slave. A list L can contain other possible identification numbers ID of other potential master objects to this object, when this object is a slave. Status data Statt, synchronization data Sync and operating mode data Modi are likewise available.

Figure 3:
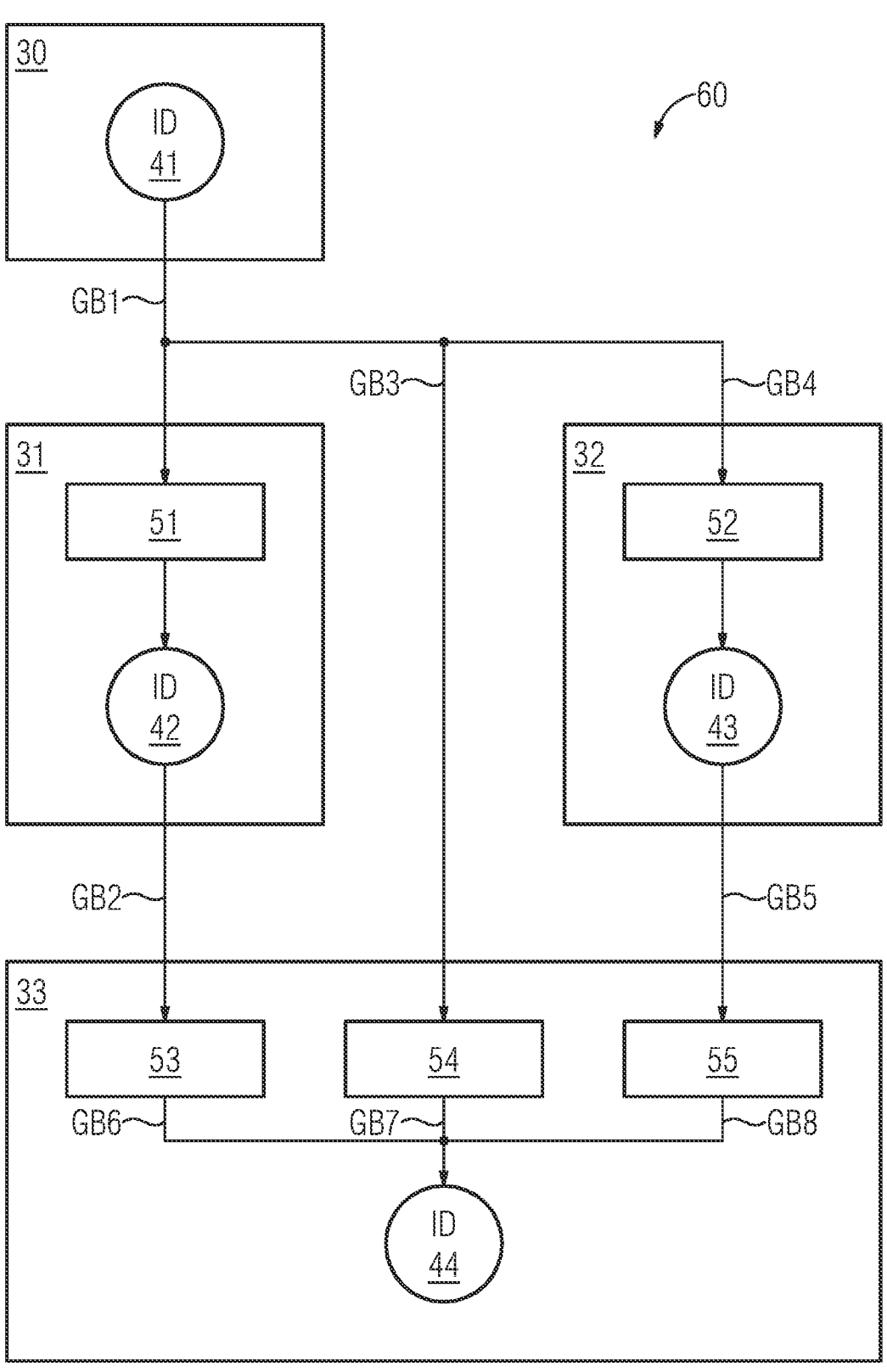
FIG. 3 shows an exemplary distributed synchronous operation between a number of controllers in accordance with the invention.

With reference to FIG. 3, an exemplary configuration is shown for synchronous relationships between different control devices. In a main controller 30, an object 41 is implemented for a master axle. In a first auxiliary controller 31, an object 42 is implemented for a first axle. In a second auxiliary controller 32, an object 43 is parameterized for a second axle. In a transfer controller 33, an object 44 is implemented for a transfer axle.

With reference to FIG. 3, the quantity of possible potential couplings 60 are shown accordingly. The object 41 for the master axle has a first synchronous relationship GB1 with the object 22 for the first axle. The object 41 likewise has a third synchronous relationship GB3 for the master axle with the object 44 for the transfer axle and a fourth synchronous relationship GB4 with the object 43 for the second axle. A second synchronous relationship GB2 exists between the object 42 for the first axle in relation to the object 44 for the transfer axle. Similarly, the object 43 for the second axle has a fifth synchronous relationship GB5 with the object 44 for the transfer axle. Each of the objects 41, 42, 43, 44 has a unique identification number ID. Disregarding the object 41 for the master axle, the remaining objects 42, 43 for the first axle and the second axle or the object 44 for the transfer axle have substitutes 51, 52, 53, 54, 55. These substitutes 51, . . . , 55 are to be considered as what are known as proxies. In particular, when the object 44 for the transfer axle maintains synchronous relationships in relation to three other objects, the substitutes are usable, accordingly a third substitute 53, a fourth substitute 54 and a fifth substitute 55 are interconnected to the object 44 for the transfer axle. Accordingly, the object 42 for the first axle has an upstream first substitute 51 and the object 43 for the second axle has a second substitute 52.

The cited objects T01, T02, T03 are to be considered as technology objects and represent real objects (e.g., an axle) in the controller. The functions of the technology objects can be retrieved in the user program via specific instructions.

These functions are executed independently of the user program in the organization components for an engineering system (motion control tasks), for instance. The technology objects control or regulate the movement of the real objects and report back status information (e.g., the current position).

The configuration of the technology objects represents the properties of the real object. The configuration data is stored in a technology data block.

Therefore, for example, a non-linear dependency of the position of a trailing axle can be defined with respect to a control axle in the case of a synchronous coupling. A technology object curve disc can be applied multiple times to different technology objects.

For a synchronous coupling of two axles, the actual position (actual value coupling) of another axle or an external sensor can also be used as a key value. The technology object synchronous axle can additionally be treated in the user program like the technology object positioning axle, i.e., even without an activated synchronous operation the axle can be positioned out from the user program precisely at a predetermined position.

Figure 4:
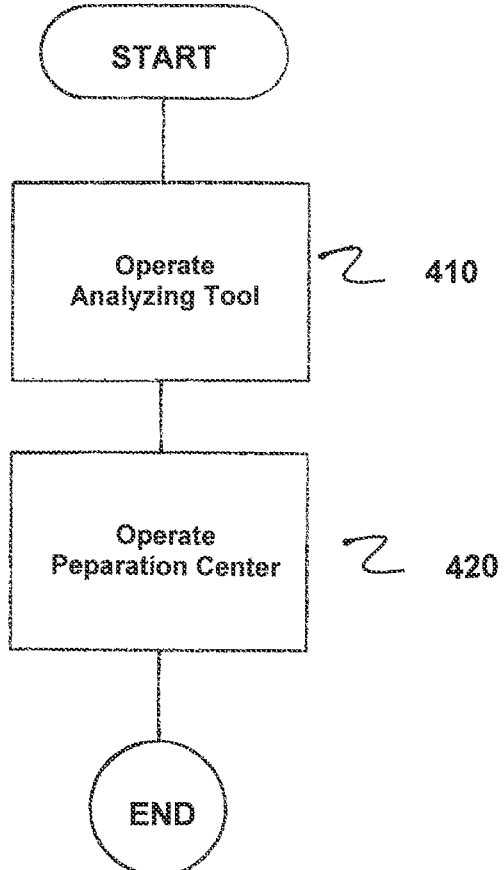
FIG. 4 is a flowchart of the method in accordance with the invention.

FIG. 4 is a flowchart of the method for graphically representing synchronous relationships GBa, GBi between a plurality of drives in an industrial plant 100, where objects T01, T02, T03 are assigned to drives in a first user program AW1 for a first control device 1 and in a second user program AW2 for a second control device 2, the objects T01, T02, T03 are configured, the plurality of drives A1, A2 are either controlled and/or regulated by the first and second user programs AW1, AW2 which are executed such that a plurality of different flow structures occurs, which have an influence on the synchronous relationships GB between the objects T01, T02, T03 such that a synchronous relationship GB, is an active synchronous relationship GBa or an inactive synchronous relationship GBa.

The method comprises operating, via an apparatus 20 for graphical representation of the active and in active synchronous relationships GBa, GBi between the objects T01, T02, T03, an analyzing tool 21 such that the first and second user programs AW1, AW2 are analyzed with respect to i the objects T01, T02, T03 and the synchronous relationships GB between the objects T01, T02, T03 via a data link and a first data record D1 relating to the objects T01, T02, T03 used is determined from analytically determined data and ii a second data record D2 relating to a temporal relation between active and inactive synchronous relationships GBa, GBi between the objects T01, T02, T03 is determined from the analytically determined data, as indicated in step 410.

Next, a preparation center 23 for representation on a display 22 is operated, as indicated in step 420. In accordance with the method, the preparation center use the determined first and second data records D1, D2 to graphically represent the objects T01, T02, T03 with their active and or inactive synchronous relationships GBa, GBi.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An industrial plant comprising:
   a first control device in which a first user program is executed;
   a second control device in which a second user program is executed;
   a plurality of drives, each of said driving being at least one of controlled and regulated by the first and second user programs;
   objects within the user programs, said objects being assigned to the plurality of drives, synchronous relationships existing between the objects, and the first and second user programs having a plurality of different flow structures, which have an influence on the synchronous relationships between the objects such that a synchronous operation is one of an active synchronous relationship and an inactive synchronous relationship; and
   an apparatus for graphical representation of synchronous relationships between the objects, the apparatus including an analyzing tool which is configured to analyze the first and second user programs with respect to the objects and the synchronous relationships between the objects via a data link and is further configured to obtain a first data record relating to (i) the objects used from analytically determined data and (ii) a second data record relating to a temporal relation between active and inactive synchronous relationships between the objects from the analytically determined data, a preparation center existing for representation on a display which is configured to graphically represent the objects with their active and or inactive synchronous relationships based on the determined first data record and the determined second data record;
   wherein the analyzing tool is configured to browse the first and second user programs for project files in which synchronous relationships have been configured between the objects to determine a quantity of potential couplings between the objects from the project files.

2. The industrial plant as claimed in claim 1, wherein the apparatus includes a recorder which is configured to install a first read service on the first control device and a second read service on the second control device;
   wherein the first and second read services are configured to perform a tracing of the objects in the first user program or in the second user program such that a temporal assignment to status data, synchronization data and operating mode data of the objects are recorded in a first trace file or a second trace file; and
   wherein the preparation center is configured to indicate on the display, aided by the recorded first and second trace files of the control devices, a course of the active synchronous relationship ( ) between two objects which are disposed on different control devices.

3. The industrial plant as claimed in claim 2, wherein the preparation center is further configured to prepare a time slider for representation in the display, the time slider being configured to display the course of the active synchronous relationship on the display for a respectively selected time instant and thus to render clear and transparent the course of the active synchronous relationships.

4. The industrial plant as claimed in claim 1, wherein the preparation center is further configured to prepare a time slider for representation in the display, the time slider being configured to display a course of the active synchronous relationship on the display for a respectively selected time instant and thus to render clear and transparent the course of the active synchronous relationships.

5. The industrial plant as claimed in claim 1, wherein the analyzing tool is configured to examine the data of the objects and the data of the synchronous relationships between the objects for specific variables which have the following subdata:

an identification number of an object, a type which can assume a values master object or slave object, a state which specifies active or inactive, an operating mode which specifies values comprising speed or position synchronous operation, and a list which specifies respective identification numbers of potential master objects to a slave.

6. A method for graphically representing synchronous relationships between a plurality of drives in an industrial plant, wherein objects being assigned to drives in a first user program for a first control device and in a second user program for a second control device, the objects being configured, the plurality of drives being at least one of controlled and regulated by the first and second user programs which are executed such that a plurality of different flow structures occurs, which have an influence on the synchronous relationships between the objects such that a synchronous relationship, is one of an active synchronous relationship and an inactive synchronous relationship, the method comprising:

operating, via an apparatus for graphical representation of the active and in active synchronous relationships between the objects, an analyzing tool such that the first and second user programs are analyzed with respect to (i) the objects and the synchronous relationships between the objects via a data link and a first data record relating to the objects used is determined from analytically determined data and (ii) a second data record relating to a temporal relation between active and inactive synchronous relationships between the objects is determined from the analytically determined data; and operating a preparation center for representation on a display, said preparation center utilizing the determined first and second data records to graphically represent the objects with their active and or inactive synchronous relationships;

wherein the analyzing tool is utilized to browse the first and second user programs for project files in which synchronous relationships have been configured and defined between the objects and a quantity of potential couplings between the objects is determined from the project data files.

7. The method as claimed in claim 6, wherein a first read service is installed on the first control device and a second read service is installed on the second control device via a recorder;

wherein the first and second read services perform a tracing of the objects in the first user program or the objects in the second user program such that a temporal assignment to status data, synchronization data and operating mode data of the objects are recorded in a first trace file or a second trace file; and wherein a course of the active synchronous relationship between two objects, which are located on different control devices, is shown on the display via the preparation center aided by the first and second recorded trace files of the first and second control devices.

8. The method as claimed in claim 7, wherein a time slider for the representation in the display is further prepared with the preparation center; and wherein the course of the active synchronous relationship, is displayable by maintenance personnel via the time slider, on the display for a respectively selected time instant such that the course of the active synchronous relationships becomes understood.

9. The method as claimed in claim 7, wherein the data of the objects and the data of the synchronous relationships between the objects is examined via the analyzing tool for specific variables which have the following subdata:

an identification number of an object, a type which can assume values comprising master object or slave object, a state which specifies active or inactive, an operating mode which specifies values comprising speed or position synchronous operation, a list which specifies identification numbers of potential master objects to a slave.

10. The method as claimed in claim 6, wherein a time slider for the representation in the display is further prepared with the preparation center; and wherein the course of the active synchronous relationship is displayable, by maintenance personnel via the time slider, on the display for a respectively selected time instant such that the course of the active synchronous relationships becomes understood.

11. The method as claimed in claim 10, wherein the data of the objects and the data of the synchronous relationships between the objects is examined via the analyzing tool for specific variables which have the following subdata:

an identification number of an object, a type which can assume values comprising master object or slave object, a state which specifies active or inactive, an operating mode which specifies values comprising speed or position synchronous operation, and a list which specifies identification numbers of potential master objects to a slave.

12. The method as claimed in claim 6, wherein the data of the objects and the data of the synchronous relationships between the objects is examined via the analyzing tool for specific variables which have the following subdata:

an identification number of an object, a type which can assume values comprising master object or slave object, a state which specifies active or inactive, an operating mode which specifies values comprising speed or position synchronous operation, a list which specifies identification numbers of potential master objects to a slave.

* * * * *